US008806968B2

(12) United States Patent
Hartmann et al.

(10) Patent No.: US 8,806,968 B2
(45) Date of Patent: Aug. 19, 2014

(54) SAMPLING CONTAINER AND USE THEREOF AS WELL AS A METHOD FOR TAKING SAMPLES

(75) Inventors: Stephan Hartmann, Freudenberg (DE); Martin Doebler, Regensburg (DE)

(73) Assignee: Krones AG (DE)

( * ) Notice: Subject to any disclaimer, the term of this patent is extended or adjusted under 35 U.S.C. 154(b) by 290 days.

(21) Appl. No.: 13/305,455

(22) Filed: Nov. 28, 2011

(65) Prior Publication Data

US 2012/0132014 A1 May 31, 2012

(30) Foreign Application Priority Data

Nov. 30, 2010 (DE) ........................ 10 2010 052 768

(51) Int. Cl.
*G01N 1/10* (2006.01)
*B01L 3/00* (2006.01)

(52) U.S. Cl.
CPC ................ *B01L 3/508* (2013.01); *B01L 3/565* (2013.01); *B01L 2200/0689* (2013.01); *B01L 3/563* (2013.01)
USPC ...................................................... 73/864.73

(58) Field of Classification Search
None
See application file for complete search history.

(56) References Cited

U.S. PATENT DOCUMENTS

| | | | | |
|---|---|---|---|---|
| 4,879,915 | A * | 11/1989 | Spencer | 73/864.74 |
| 4,899,601 | A * | 2/1990 | Lee | 73/864.63 |
| 5,948,998 | A * | 9/1999 | Witte et al. | 73/864.14 |
| 6,056,136 | A * | 5/2000 | Taber et al. | 215/252 |
| 6,716,396 | B1 * | 4/2004 | Anderson et al. | 422/501 |
| 6,981,607 | B2 * | 1/2006 | Lown et al. | 220/254.3 |
| 2005/0150856 | A1 * | 7/2005 | Ozawa et al. | 215/44 |
| 2009/0037293 | A1 * | 2/2009 | Unger et al. | 705/27 |
| 2009/0223920 | A1 * | 9/2009 | Patel et al. | 215/45 |
| 2011/0290755 | A1 * | 12/2011 | Taber et al. | 215/329 |
| 2012/0269602 | A1 * | 10/2012 | Hanafusa et al. | 413/22 |

FOREIGN PATENT DOCUMENTS

| | | | |
|---|---|---|---|
| DE | 7030518 | 4/1971 | |
| DE | 91 08 396.6 | 10/1991 | G01N 1/10 |
| DE | 298 09 216 | 8/1998 | B65D 1/02 |

* cited by examiner

*Primary Examiner* — Robert R Raevis

(74) *Attorney, Agent, or Firm* — Hayes Soloway P.C.

(57) ABSTRACT

A sampling container for receiving media from a container filling system includes a closed base region, a peripheral wall adjoining the base region and extending substantially orthogonal to the base region, and a filling region opposite the base region and adjoining the peripheral wall. The filling region has a container neck extending substantially orthogonal to the base region and includes a filling opening. An outer thread is arranged over an outer periphery of the container neck. The thread has an outer diameter between 44 and 46 mm and a core diameter between 41 and 43 mm, and rounded edges, at least over portions, with a radius between 0.95 and 1.05 mm. The container neck can be arranged in a receiver of a sampling head, during the sampling process so that the container is sealed in a media-tight manner in relation to an ambient environment.

20 Claims, 3 Drawing Sheets

SAMPLING CONTAINER AND USE THEREOF AS WELL AS A METHOD FOR TAKING SAMPLES

BACKGROUND OF THE INVENTION

The present invention relates to a container, for receiving media during a sampling of media from a container filling system.

Containers or bottles for receiving media during the sampling of media from a container filling system are already known from the prior art, but these containers generally consist of glass, which exhibits the property of splitting and cracking during the filling process, for example owing to the excess pressure or vacuum.

Since the containers are arranged with their opening in a receiving device of a sampling head for example in such a way that they are sealed in relation to the external environment in an airtight manner or in a practically airtight manner with use of a sterile filter in a vent opening whilst the sampling person allows the medium to be sampled to flow from a sampling cock, which is connected to the filling system, to the sampling head via a connection line and consequently into the container, it is possible that the container will be damaged or may even crack open in an explosive manner owing to an overpressure or vacuum created in said container depending on whether cold or hot media are to be introduced into the container.

The sampling person, who is located close to or directly on the container during the removal of the medium to be sampled, may be badly injured by splinters of glass flying around.

So as to avoid any such physical damage to the sampling person, plastic covers are used for example in the prior art which are placed over the glass bottles before the sampling process in order to protect the sampling person against glass splinters flying around, should the bottle explode.

However, the sample itself also can no longer be used with a destroyed sampling container, since it is contaminated by the container and the corresponding glass splinters and can no longer be used for analyses. This is critical in particular when sampling from cold-aseptic container filling systems, since in this case a more detailed analysis of the microbiological state of the system has to be provided during the entire production period owing to reasons of product safety. In addition, burst tests carried out with the plastic cover revealed that glass splinters cannot be completely prevented from escaping from the plastics cover since, owing to the plastic cover cap, which is not fastened fixedly to the container or the screw connection, glass splinters also infiltrate between this screw connection and the plastic cover any may injure the sampling person.

The object of the present invention is therefore to provide a container for receiving media during a sampling of media, for example from a container filling system, which container also does not explode or splinter when an overpressure or vacuum is applied, such that the sampling device is not at risk during the sampling process and the media sample taken is not contaminated and can consequently be analysed at any moment in time.

SUMMARY OF THE INVENTION

The container according to the invention for receiving media during a sampling of media from a container filling system comprises a closed base region, a peripheral wall adjoining the base region and extending substantially orthogonal to the base region, and a filling region opposite the base region and adjoining the peripheral wall. The filling region itself also comprises a container neck extending substantially orthogonal to the base region and comprising a filling opening, wherein an outer thread is arranged over an outer periphery of the container neck, at least over portions. This outer thread has an outer diameter between 44 and 46 mm and a core diameter between 41 and 43 mm as well as rounded edges, at least over portions, with a radius (radius of curvature) between 0.95 and 1.05 mm. Furthermore, the container neck or the outer thread can be arranged in a receiving means of a sampling head, at least over portions, during the sampling process in such a way that the container is sealed in a media-tight manner in relation to an ambient environment. In addition, the container according to the invention consists of plastics material.

Consequently, not only are the peripheral wall, the base region and the filling region of the container or bottle produced from a plastics material, but preferably also the container neck, on which an outer thread is preferably cut or rolled or arranged and also consists or is formed of plastics material.

The container according to the invention is therefore preferably formed in one piece.

However, it is conceivable for the container neck and/or the outer thread to be formed of a metal material and to be arranged, for example during an overmoulding process, on the filling region of the container.

Furthermore, it is also possible for the container neck to have no outer thread, but instead an inner thread. For example, the type of thread is dependent on the structural design of the receiving means or on the seals used for the container.

In other words, if the receiving means itself has an inner thread in which an outer thread could be screwed, it is thus conceivable for the container neck to have an outer thread to screw the container into the receiving means.

Accordingly, a seal of the container according to the invention would also have to have an inner thread corresponding, in terms of structure, to the inner thread of the receiving device.

It is also possible for the container according to the invention to be connected to the sampling head not by a receiving means, but instead to be connected directly to the sampling head.

For this purpose it would be advantageous if the sampling head also had an inner thread into which the container according to the invention can be screwed.

Alternatively, if the sampling head has an inner thread into which the outer thread of the container according to the invention cannot be screwed, it is conceivable to arrange an adapter element between the container according to the invention and the sampling head, the adapter element thus comprising an outer thread which can be screwed into the inner thread of the sampling head.

The container according to the invention preferably consists of polylactide, polyethylene, polyethylene terephthalate, polypropylene or of a combination thereof. However, the container according to the invention is not limited to the plastics materials named here. Instead it should be noted that the container according to the invention can be manufactured from any commercially available plastics material which is suitable for the use of a container for receiving media.

In addition, it is also conceivable for the container to consist not just of a plastics material, but for example of a mixture or a combined assembly of conventional plastics materials, in so far as these can be interconnected and used for a container for receiving media.

In other words for example, the base region may consist of a plastics material which is different from that of the peripheral wall, and this in turn may consist of a plastics material which is different from that of the filling region or the container neck. Alternatively, a multi-layered structure of the container is possible.

Furthermore, the container according to the invention can preferably be autoclaved. That is to say, the container according to the invention can be sterilised, for example by means of an autoclave, in other words a pressure vessel which can be sealed in a gas-tight manner, and consequently has to be pressure- and temperature-resistant, for example so as not to deform during the sterilisation process.

In addition, the container according to the invention is preferably pressure-resistant up to at least 2 bar and more preferably up to at least 6.5 bar, for example so as not to explode during the removal of the sample medium from the filling system and therefore during the filling of the sample medium into the container according to the invention.

Furthermore, the container according to the invention is characterised in that it is preferably also vacuum-resistant so that there is no deformation or tearing of the container or of the container walls during the filling process, for example of hot sample media.

For example, this is enabled by defined wall thicknesses, wherein the wall thickness of the peripheral wall of the container according to the invention is for example between 0.3 and 1 mm and preferably between 0.4 and 0.5 mm, and the wall thickness of the base region of the container according to the invention is thicker, at least over portions, than the wall thickness of the peripheral wall of the container according to the invention.

However, it is also conceivable for the wall thickness of the container to be much more than 1 mm (up to 5 mm) so as to counteract a deformation or an explosion of the container during the filling process.

The container according to the invention accordingly exhibits no splitting area of break during and also after the taking of the sample medium, that is to say during application of an overpressure or vacuum to the container. Consequently, the sampling person is not injured by flying splinters of the container according to the invention or by handling of the container according to the invention, for example during removal of the container according to the invention from the sampling head.

In a preferred embodiment the container according to the invention has a capacity of at least 2 liters, although capacities of less than 2 liters, for example 1 liter or 0.75 liters, 0.5 liters or 0.3 liters and less, as well as capacities of more than 2 liters, for example 2.5 liters, 3 liters or 5 liters and more are also conceivable.

In accordance with a further preferred embodiment the container neck comprises a wall or a peripheral wall which, in the region of the filling opening, has a terminal edge oriented substantially orthogonal to the wall so that a corresponding sealing element can be arranged to provide a media-tight seal.

In other words, this terminal edge is designed in a planar or flat manner in such a way that a corresponding sealing element or a corresponding sealing washer can be easily positioned over this edge to seal the medium to be filled into the container in relation to the ambient environment surrounding the container.

In order to arrange the container according to the invention easily on or in a sampling head, it is conceivable to use adapter elements suitable for this purpose, which connect the container according to the invention to the sampling head in a media-tight manner with the aid of the receiving means.

Such adapter elements are preferably annular and preferably consist of a metal material which is preferably very tough and is characterised, for example, by a high level of resistance to heat and corrosion.

However, it is also conceivable for the adapter element to be formed of a ceramic material or else of plastics material.

The adapter element preferably comprises an internal, substantially planar inner wall and an outer wall, on which an outer thread is formed.

This outer thread of the adapter element may correspond to the structural design of the outer thread which has already been described above, or may also be an outer thread which differs in terms of structure from this outer thread of the container.

However, it should be noted that the outer thread of the adapter element should correspond in terms of structural design to an inner thread of the sampling head so as to ensure an arrangement of the adapter element on the sampling head.

Whereas one side of the adapter element is arranged on the sampling head, the second side of the adapter element, which is opposite the first side, can be arranged on the side of the filling opening of the container and therefore above the filling opening.

A sealing element, as already described above, is preferably to be arranged between the adapter element and the container according to the invention to produce a sufficient sealing of the sample medium to be filled into the container according to the invention in relation to the ambient environment.

In a preferred embodiment the adapter element comprises a substantially annular seal seat on a first side, via which the adapter element is arranged on the sampling head.

This seal seat is preferably characterised in that, on this first side of the adapter element, either the outer wall extends further than the inner wall of the peripheral surface, or the inner wall extends further than the outer wall of the peripheral surface, or in that the outer and inner walls of the peripheral surface extend further in such a way that a recess is formed between them, in which a ring seal can be arranged.

The recess and the walls or sides of the peripheral surface of the adapter element which extend longer are formed in such a way that the ring seal nevertheless protrudes beyond the peripheral surface of the adapter element so as to ensure a seal with the adjacent sampling head.

In a further preferred embodiment the adapter element comprises, on a second side which is opposite the first side arranged on the sampling head, a protrusion extending substantially radially outwardly.

For example, this protrusion may have a substantially square or oval cross-section. However, the shape of this protrusion is not restricted. It is noted that all imaginable shapes of the protrusion may be applied, provided they make it possible for example to stabilise a ring seal or O-ring or to lock it in a defined position.

In a further preferred embodiment the adapter element therefore comprises a first substantially flexible ring seal which is arranged removably in the seal seat, and preferably also a second ring seal which is arranged in the region of the protrusion.

For example, commercially available O-rings may be used as ring seals.

In addition, an assembly is claimed which, in addition to the container according to the invention and optionally the adapter element, also comprises a receiving means for receiving the container or for arranging the container on an adapter element.

The receiving means is preferably substantially annular and comprises an inner thread which can be screwed onto the outer thread of the container.

The inner thread is consequently the structural counterpart of the above-described outer thread of the container.

The receiving means accordingly constitutes an intermediate element which connects the container according to the invention to the adapter element in a media-tight manner, whilst the adapter element is screwed into the sampling head in a media-tight manner.

For this purpose, the receiving means preferably comprises a through-opening for guiding through at least a portion of the adapter element. For example, the region of the outer thread of the adapter element can thus be pushed through the receiving means, wherein the outer thread of the adapter element ultimately protrudes from the receiving means.

The protrusion with the second ring seal arranged on the protrusion is used for mounting of the receiving means, whereby the second ring seal ensures a sufficient media-tight seal between the receiving means and the adapter element.

The through-hole consequently has a substantially smaller inner diameter than a core diameter of the inner thread of the receiving means or has a smaller inner diameter than the outer diameter of the protrusion.

The adapter element is thus prevented from sliding through the through-opening in the receiving element.

The receiving means is preferably produced from plastics material, wherein any plastics materials known from the prior art can be used to produce the receiving means, provided they are suitable for use as receiving means.

The receiving means is preferably produced from the same plastics material as the container.

However, it is also conceivable for the receiving means to be produced, for example, from a metal or ceramic material, although in this case it should be considered that it must be possible to screw the receiving element onto a container according to the invention.

In addition, a use of the assembly is claimed, wherein the sterilised (preferably in an autoclave) assembly for sampling the media from a container filling system is preferably used. The container neck of the container according to the invention is arranged in a receiving means of a sampling head, at least over portions, during the sampling process in such a way that the container is sealed in a media-tight manner or in a practically media-tight manner in relation to an ambient environment.

The assembly itself preferably consists of the container according to the invention, the adapter element and the receiving means, which connects the adapter element to the container, wherein the adapter element is arranged on the sampling head.

Furthermore, a method for sampling the media from a container filling system using the container according to the invention is proposed, wherein the container is connected to at least one adapter element to form an assembly which is sterilised, preferably in an autoclave, and is first arranged on a sampling head after cooling. The sampling cock, which is preferably connected to a pipeline of the container filling system, is then opened so that a defined sampling volume flows from the system into the container. Lastly, once the sampling process is over, the sampling cock is closed again and the assembly is removed from the sampling head, preferably before the container is disassembled from the assembly and closed by a seal.

The sampling head is advantageously fitted to a connection line which is connected to a sampling cock. The defined sampling volume advantageously flows substantially continuously into the container, that is to say an intermittent stream of the sample can flow into the container, for example 100 ml every 5 minutes.

It is also conceivable for the connection line, the sampling head, the adapter element, the receiving means and the container according to the invention to be interconnected or assembled together to form an assembly, and consequently sterilised jointly in the assembled state in an autoclave or in a steam steriliser. For example, for this purpose the above-described assembly may be wrapped up beforehand in aluminium foil, before it is sterilised.

Once the interconnected components have been cooled, preferably in the autoclave, this assembly is transported to the sampling point of a container filling system for example and is only then removed from the aluminium foil in substantially sterile ambient conditions and connected to the sampling cock.

The sampling cock itself is preferably assembled on a pipeline and sterilised before connection of the above-described assembly, particularly preferably by circulating saturated steam, or else by spraying or flushing with alcohol solution and, for example, by the use of a Bunsen burner.

Once the assembly has been arranged on the sampling cock, the assembly is steamed and the cock is then opened so that, for example, a defined or small sampling volume can flow into the container according to the invention in a steady and continuous manner.

For example, if a sampling volume of the medium sufficient for analysis was removed, the sampling cock is closed again before the assembly is removed from the sampling cock under substantially sterile ambient conditions.

It is then possible, under substantially sterile ambient conditions, to disassemble the container according to the invention from the components mounted on the container so as to then seal the container using a preferably sterile sealing head or lid.

However, it is also conceivable that the entire above-mentioned assembly is not sterilised in the assembled state in the autoclave, but instead that all components (connection line, sampling head, adapter element, receiving means and/or container) are packed for example in aluminium foil and then sterilised separately in the autoclave.

The individual components would accordingly also only be unwrapped from the film and assembled together at the sampling point.

BRIEF DESCRIPTION OF THE DRAWINGS

Further advantages, objectives and properties of the present invention will be described with reference to the following description of the accompanying drawings, in which an embodiment of the container according to the invention, which is arranged in a sampling head, is illustrated by way of example.

Components which are functionally like in the figures, at least in principle, may be indicated by like reference numerals, these components not necessarily being indicated and described in all figures.

In the figures:

FIG. 1 is a schematic view of a sampling means and an embodiment of the container according to the invention, which is arranged in a sampling head of the sampling means;

FIG. 2 is a structural view of a detail of an embodiment of the outer thread of the container according to the invention;

FIG. 3 is a structural view of a detail of an embodiment of the inner thread of the receiving means; and FIG. 4 is a schematic view of an embodiment of the adapter element.

DETAILED DESCRIPTION OF THE INVENTION

Figure 1:
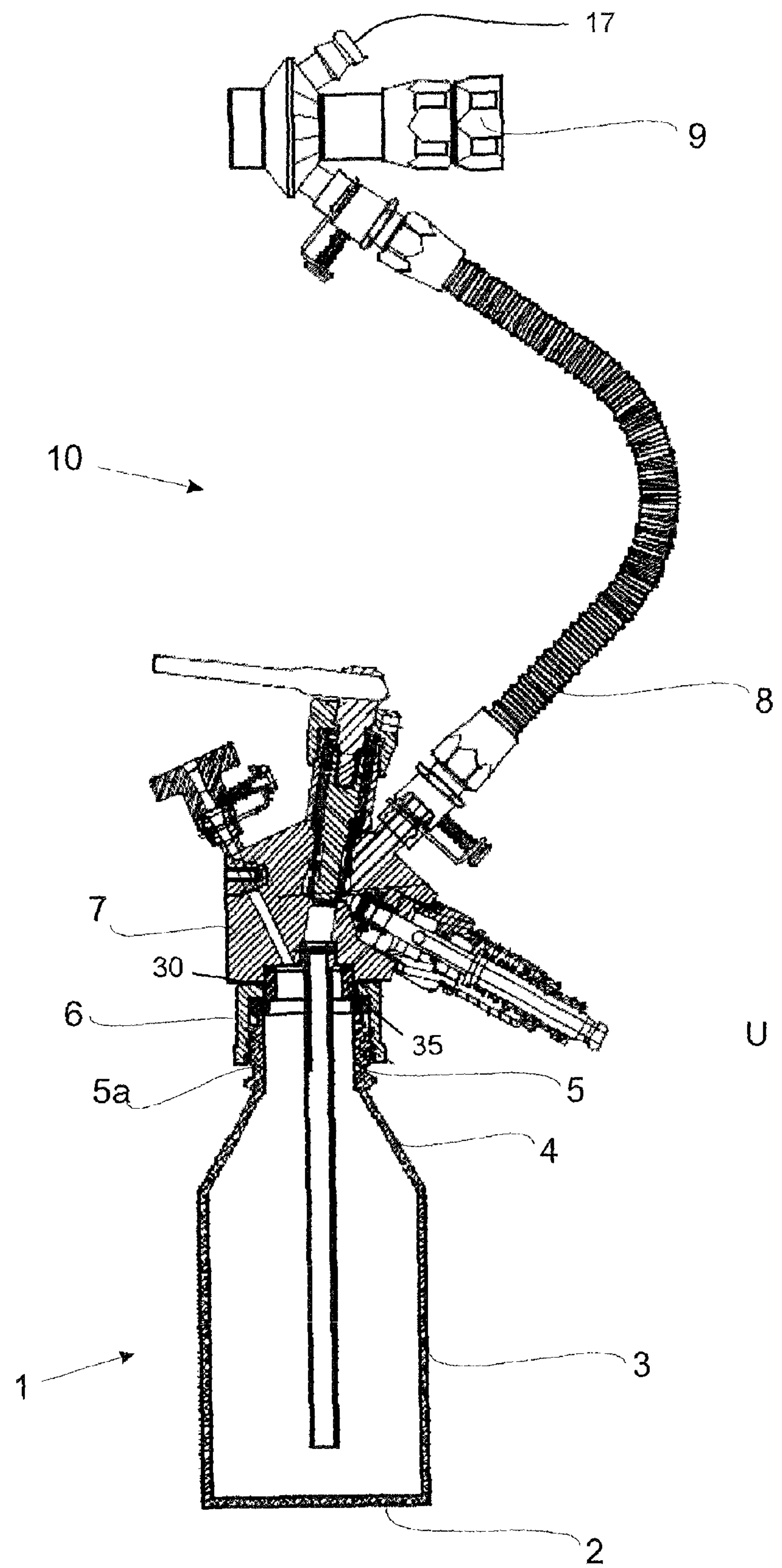

The embodiment shown in FIG. 1 of the container according to the invention 1 comprises a base region 2, a wall 3 or peripheral wall 3 extending orthogonal from the base region 2, and a filling region 4 which extends from the peripheral wall inwardly or into the container at a defined angle. A container neck 5 is connected opposite the base region 2 in a manner adjoining the filling region 4 and comprises a filling opening (not shown in this case).

In this case, “orthogonal” is to be understood to mean perpendicular or substantially perpendicular, and therefore the peripheral wall 3 and the base region 2 form a right angle. However, it is also conceivable for the peripheral wall 3 to first extend radially outwardly so as to then extend radially inwardly again in an upper region of the container 1, the container 1 thus comprising a peripheral convex swelling and consequently being shaped in the form of a convex bottle.

It is also possible for the peripheral wall 3 to first extend radially inwardly before it curves radially outwardly again in an upper region of the container 1. The container 1 is thus formed approximately in the shape of an hour glass.

It is therefore conceivable for the container 1 to have any desired shape and to not be limited to the shape shown in FIG. 1.

An outer thread **5*a* is arranged over the outer periphery of the container neck 5 or is cut from the material of the container neck 5** or is rolled or preferably moulded or cast.

The container 1 is consequently produced in one piece.

The container 1 is arranged on a sampling device 10, which consists at least of a sampling head 7, a sampling cock 9 and a connection piece 8 between the sampling cock 9 and the sampling head 7, so that a receiving means 6 of the sampling head 7 surrounds at least an upper region of the container neck 5 or the outer thread **5*a*** at least in part, but preferably completely.

An adapter element 30 is also shown which is arranged above the container 1 and is fixed in a media-tight manner on the container 1 by the receiving means 6 and is screwed into the sampling head 6, which comprises an inner thread (not shown in this case), by means of an outer thread (not shown in this case).

It is consequently possible to seal the container 1 or the inlet opening of the container 1 in relation to the ambient environment U in a media-tight manner so as to prevent contamination of the sample medium, for example by the ambient air.

Once at least the connection line 8 has been connected to the sampling cock 9 and to the sampling head 7, saturated steam can be fed from a steam connection point 17 so that any bacteria which may have been introduced during the connection process is eliminated again.

The medium to be sampled is removed via the sampling cock 9 from a filling system (not shown in this case) on which the sampling cock 9 is arranged, is transported via the connection piece 8 or the connection line 8 to the sampling head 7 and is fed to the container 1, which is arranged on or fixed to the sampling head 7.

The pressure-resistant container 1, which can also be autoclaved, is then removed again from the receiving means 6 of the sampling head 7 after having been filled with the sample medium and is transported into the corresponding production department for analysis of the sample medium. The assembly of container 1 and sampling head 7 is preferably transported in the assembled state. Only in the production department is the assembly opened under sterile ambient conditions.

Figure 2:
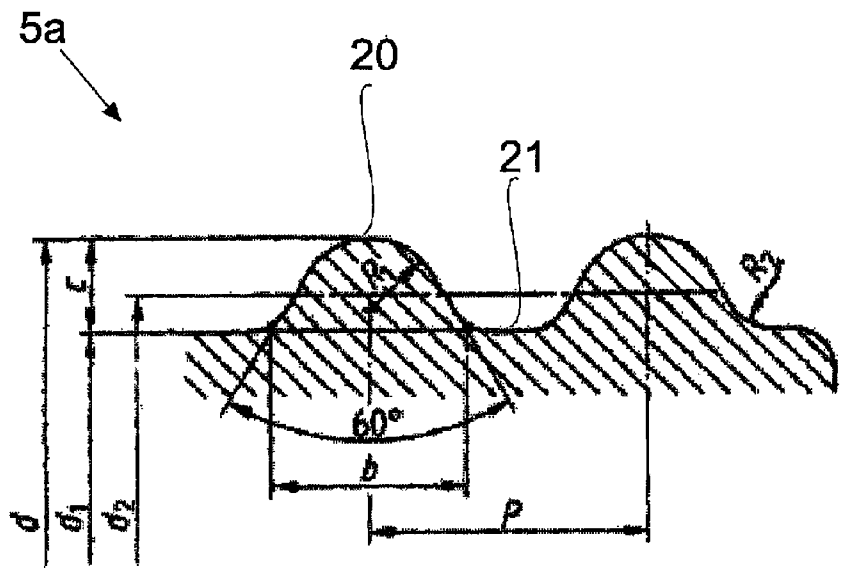

FIG. 2 shows the structural detail of an embodiment of the outer thread **5*a* of the container 1, wherein two edges 20 (peak) and a region of the thread pitch 21 (valley) are illustrated. The rounded edges 20 of the outer thread 5*a* indicate a round thread wherein the radius $R_1$ of the edges 20 is greater than the radius $R_2$ of the region of transition from the edge 20 to the thread pitch 21**.

The outer diameter d is always greater than the core diameter $d_1$. The thread profile depth c is calculated both from the difference between the outer diameter d of the edges 20 and the core diameter $d_1$ of the thread pitch 21 and from the following formula:

$$c = \frac{b}{2} = \frac{P*k}{2},$$

in which the thread profile width b, which is calculated from the pitch number P and the constant for the structure of the thread profile k, is halved.

The pitch diameter $d_2$, which is approximately between the outer diameter d and the core diameter $d_1$, is calculated as follows for example:

$$d_2 = d - P\left[\frac{\sqrt{3}}{2} + k\left(1 - \sqrt{3}\right)\right],$$

wherein P is the pitch, which is preferably between 3 and 5 mm in this thread.

The radius $R_1$ of the edge 20 may, for example, also be calculated by multiplying the thread profile width b as follows:

$$R_1 = 0.366*b.$$

Figure 3:
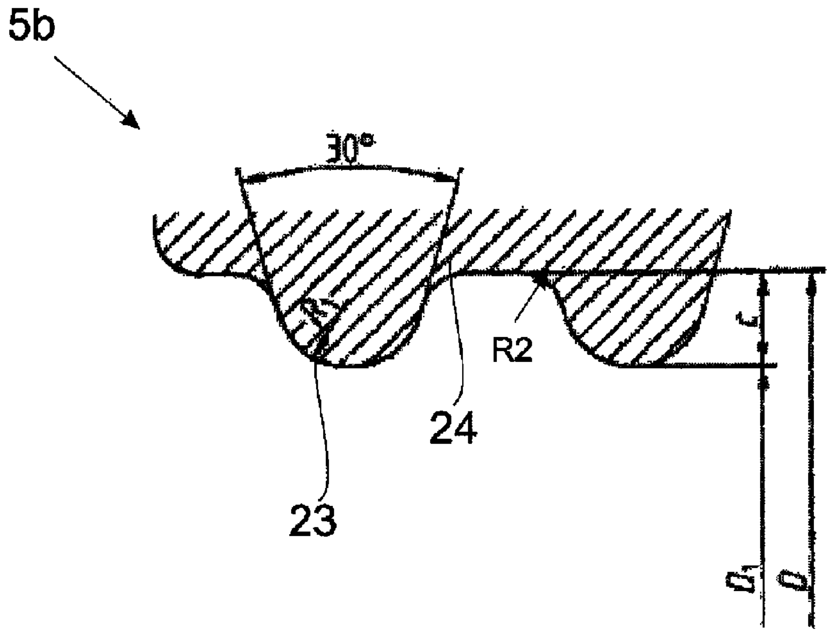

FIG. 3 shows the structural counterpart to FIG. 2, that is to say an inner thread **5*b* which has a structurally similar design to the outer thread 5*a***.

According to FIG. 3, the edges 23 of the inner thread **5*b* are rounded and have a radius $R_1$ which is greater than the radius $R_2$, which is provided in a region of transition between the edge 23 and the thread pitch 24**.

The core diameter $D_1$ of the inner thread is also always smaller than the outer diameter D of the inner thread.

The calculations for example for thread profile depth c or pitch diameter $D_2$ expediently correspond to the formulae and calculations for outer diameter given above.

Figure 4:
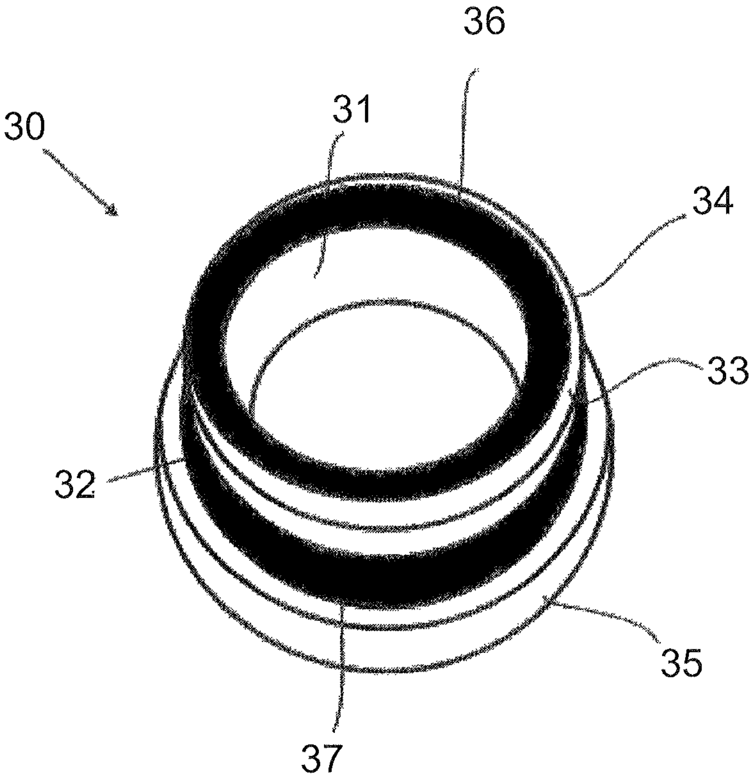

FIG. 4 shows an embodiment of the annular adapter element 30, which comprises a substantially planar inner wall 31 and an outer wall 32.

An outer thread 33 is arranged over the outer face of the outer wall 32 and has been produced, for example, by cutting or rolling (for example in the case of a metal adapter element), or has been moulded on by injection moulding (for example in the case of a plastics material element).

The outer thread 33 may correspond in terms of structural design to the above-mentioned outer thread **5*a* or may be designed with a structure deviating from this thread 5*a***.

Furthermore, the adapter element 30 comprises a protrusion 35 extending radially outwardly, of which the cross-section is basically square so that a ring seal 37 can be arranged vertically above this protrusion 35 without damage. Alternatively, the protrusion 35 may also seal directly on the adapter element 30, without an additional ring seal 37.

A further ring seal 36 or washer 36 is arranged vertically above the thread 33 and lies in a recess 34 which forms a seal seat 34. This recess 34 is formed by an outer wall 32 extending perpendicularly upwards further than the inner wall 31.

The applicant reserves the right to claim all features disclosed in the application documents as being essential to the invention, provided they are novel either individually or in combination compared to the prior art.

LIST OF REFERENCE NUMERALS

1 container
2 base region
3 peripheral wall
4 filling region
5 container neck
5*a* outer thread
5*b* inner thread
6 receiving means
7 sampling head
8 connection piece or connection line
9 sampling cock
10 sampling device
17 steam connection point
20 edge of the outer thread
21 thread pitch of the outer thread
23 edge of the inner thread
24 thread pitch of the inner thread
30 adapter element
31 inner wall
32 outer wall
33 outer thread
34 seal seat
35 protrusion
36 first ring seal
37 second ring seal

The invention claimed is:

1. A container for receiving media during a sampling of the media from a container filling system, the container being pressure and vacuum resistant, and comprising a closed base region, a peripheral wall adjoining the base region and extending substantially orthogonal to the base region, and a filling region opposite the base region and adjoining the peripheral wall, said filling region comprising a container neck extending substantially orthogonal to the base region and comprising a filling opening, and an outer thread being arranged over an outer periphery of the container neck, at least over portions, said thread having an outer diameter between 44 and 46 mm and a core diameter between 41 and 43 mm as well as rounded edges, at least over portions, with a radius between 0.95 and 1.05 mm, the container neck being able to be arranged in a receiver of a sampling head, at least over portions, during the sampling in such a way that the container is sealed in a media-tight manner in relation to an ambient environment (U), wherein the container is formed of a plastics material.

2. The container according to claim 1, wherein the container is formed of a plastics material selected from the group consisting of polylactide, polyethylene, polyethylene terephthalate, polypropylene and a combination thereof.

3. The container according to claim 1, wherein the container can be autoclaved.

4. The container according to claim 1, wherein a wall thickness of the base region of the container is thicker, at least over portions, than the wall thickness of the peripheral wall of the container.

5. The container according to claim 1, wherein the container neck comprises a wall which, in the region of the filling opening, has a terminal edge oriented substantially orthogonal to the wall so that a corresponding sealing element can be arranged to provide a media-tight seal.

6. An assembly for taking samples, comprising a container according to claim 1 and an adapter element, wherein the adapter element is substantially annular.

7. The assembly according to claim 6, wherein the adapter element is arranged above the container and is fixed in a media-tight manner on the container.

8. The assembly according to claim 7, wherein the adapter element is fixed in a media fight manner on the container by a receiver.

9. The assembly according to claim 6, wherein the adapter element is screwed into the sampling head.

10. The assembly according to claim 9, wherein the adapter element is screwed into the sampling head, which comprises an inner thread, by means of an outer thread.

11. The assembly according to claim 6, wherein the adapter element comprises an internal, substantially smooth inner wall and an outer wall on which an outer thread is moulded.

12. The assembly according to claim 6, wherein a sealing element can be arranged between the adapter element and the container.

13. The assembly according to claim 6, wherein the adapter element comprises a first, substantially flexible ring seal which is arranged removably in a seal seat.

14. The assembly according to claim 6, wherein the receiver comprises an inner thread which can be screwed onto the outer thread of the container.

15. The assembly according to claim 6, wherein the receiver is made from plastics material.

16. A method for sampling media from a container filling system using an assembly according to claim 6, wherein the assembly is sterilised and the container neck of the container is arranged in a receiver of a sampling head, at least over portions, during the sampling process in such a way that the container is sealed in a media-tight manner in relation to an ambient environment (U).

17. The method according to claim 16, wherein the assembly is sterilized in an autoclave.

18. A method for sampling media from a container filling system using a container according to claim 1, wherein the container is connected to at least one adapter element to form an assembly which is sterilised and is only arranged on a sampling head after cooling, a sampling cock is then opened so that a defined sampling volume flows into the container and, once the sampling process is over, the sampling cock is closed again and the assembly is removed from the sampling head.

19. The method according to claim 18, wherein the assembly is sterilised in an autoclave.

20. The method according to claim 18, wherein the assembly is removed from the sampling cock before the container is disassembled from the assembly and is closed with a seal.

* * * * *

UNITED STATES PATENT AND TRADEMARK OFFICE

CERTIFICATE OF CORRECTION

PATENT NO. : 8,806,968 B2
APPLICATION NO. : 13/305455
DATED : August 19, 2014
INVENTOR(S) : Hartmann et al.

It is certified that error appears in the above-identified patent and that said Letters Patent is hereby corrected as shown below:

In the Claims

Claim 8, Col. 10, line 13, "media fight" should be --media-tight--.

Signed and Sealed this
Second Day of December, 2014

Michelle K. Lee
*Deputy Director of the United States Patent and Trademark Office*